ns Patent Office
3,491,088
Patented Jan. 20, 1970

3,491,088
10,5 - (IMINOMETHANO) - 10,11 - DIHYDRO-5H-DIBENZO[a,d]CYCLOHEPTEN - 13 - ONE AND DERIVATIVES
Thomas A. Dobson and Martin A. Davis, Montreal Quebec, Canada, assignors to American Home Products Corporation, New York, N.Y., a corporation of Delaware
No Drawing. Filed July 29, 1966, Ser. No. 568,745
The portion of the term of the patent subsequent to Feb. 4, 1986, has been disclaimed
Int. Cl. C07d 41/06, 29/22; A61k 27/00
U.S. Cl. 260—239.3                                      8 Claims

ABSTRACT OF THE DISCLOSURE

There are disclosed herein 10,5-(iminomethano)-10,11-dihydro-5H-dibenzo[a,d]cyclohepten-13-one and its derivatives possessing a lower alkyl group containing from one to four carbon atoms, the allyl group, the benzyl, phenethyl, or trimethoxybenzyl group, the dimethylaminopropyl or diisopropylaminopropyl group in positions 11 or 13 or in both these positions. In addition, the compounds combining any of the substituents named above in position 11 with a pyrrolidinoethyl, piperidinoethyl, (N'-methylpiperazino)propyl or morpholinoethyl group as substituent in position 13 are also disclosed. The compounds have anticonvulsant and trichomonicidal activities and methods for their preparation and use are also given.

This invention relates to novel chemical compounds having useful biological properties and to intermediates used in their preparation. In particular, this invention relates to derivatives of 10,5-(imonomethano)-10,11-dihydro-5H-dibenzo[a,d]cyclohepten-13-one of the following generic Formula I:

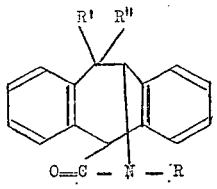

wherein R represents hydrogen, or an organic group, such as, a lower alkyl group containing from 1–4 carbon atoms, an unsaturated lower alkyl group, such as, for example, the allyl group, an aralkyl group containing from 7–10 carbon atoms such as, for example, the benzyl-phenethyl or trimethoxybenzyl groups, a dialkylaminoalkyl group containing from 4–9 carbon atoms, such as, for example, the dimethylaminoethyl, dimethylaminopropyl, or the diisopropylaminopropyl group, of a heterocyclicalkyl group containing from 5–8 carbon atoms, and from 1–2 hetero atoms, such as, for example, the pyrrolidinoethyl, the piperidinoethyl, the (N'-methylpiperazino)propyl, or the morpholinoethyl group, R' represents hydrogen or hydroxyl, and R" represents an organic group such as, a lower alkyl group containing from 1–4 carbon atoms, an unsaturated lower alkyl group such as, for example, the allyl group, the phenyl group, an aralkyl group containing from 7–10 carbon atoms, such as, for example, the benzyl, phenethyl, or trimethoxybenzyl group, or a substituted dialkylaminoalkyl group containing from 5–9 carbon atoms, such as, for example, the dimethylaminopropyl, diethylaminopropyl, or the diisopropylaminopropyl group. This invention also relates to the pharmacologically acceptable salts of the basic compounds of Formula I.

The compounds of this invention are active against Trichomonas vaginalis and are useful as trichomonicidal agents. As such they may be formulated with suitable excipients such as, for example, starch or lactose, in the form of vaginal tablets or inserts, containing from 50–250 mg. of the active ingredients, and may be administered from one to three times per day as directed by the physician.

The compounds of this invention are prepared by reacting a 10,5 - (iminomethano) - 10,11 - dihydro - 5H-dibenzo[a,d]cyclohepten-11,13-dione of Formula II in which R represents hydrogen, a lower alkyl group, or an aralkyl group with the number of carbon atoms in the above groups as defined above, prepared as described in our co-pending U.S. patent application, S.N. 552,387 filed May 24, 1966 (AHP-4044), with an appropriate Grignard reagent of the formula R"MgX in which R" is an organic group, as defined above, and X represents a halogen of atomic weight greater than 19, to obtain the compounds of Formula I in which R is as defined above, R' represents the hydroxyl group, and R" is as defined above.

The 10,5-(iminomethano)-10,11-dihydro - 5H-dibenzo[a,d]cyclohepten-11,13-diones of Formula II in which R represents the allyl group, a dialkylaminoalkyl group containing from 4–9 carbon atoms, or a heterocyclicalkyl group containing from 5–8 carbon atoms and 1–2 hetero atoms as defined above, are prepared as described below. They are reacted with an appropriate Grignard reagent of the formula R"MgX as defined above to yield the compounds of Formula I in which R represents the allyl group, a dialkylaminoalkyl group containing from 4–9 carbon atoms, or a heterocyclicalkyl group containing from 5–8 carbon atoms and from 1–2 hetero atoms, R' represents the hydroxyl group, and R" is as defined above.

The latter compounds may then be hydrogenolyzed by treatment with an alkali metal in either ammonia or a primary or secondary amine as a solvent, preferably sodium in liquid amonia, to yield the compounds of Formula I in which R is as defined above, R' represents hydrogen, and R" is as defined above.

Alternatively, the compounds of Formula I in which R represents hydrogen and R' and R" are as defined above, may also be treated with an organic halide of the formula R—X in which R is as defined above and X is a halogen of atomic weight greater than 19, in the presence of an alkali metal hydride, preferably sodium hydride, to yield the compounds of Formula I in which R represents an organic group as defined above and R' and R" are as defined above.

The starting materials for the compounds of this invention, viz., the 11-hydroxy-10,5-(iminomethano)-10,11-dihydro-5H-dibenzo[a,d]cyclohepten-13-ones of Formula I in which R is as defined above, R' represents the hydroxyl group, and R" represents hydrogen, and the 10,5-(iminomethano) - 10,11-dihydro-5H-dibenzo[a,d]cycloheptene-11,13-diones of Formula II in which R represents hydrogen, a lower alkyl group containing from 1–4 carbon atoms, or an aralkyl group containing from 7–10 carbon atoms may be prepared as described in our co-pending U.S. patent applications cited above. Briefly, this process entails the addition of one molar proportion of bromine to 5H-dibenzo[a,d]cyclohepten-5-carboxamide, prepared as described by M. A. Davis et al., in J. Med. Chem., vol 7, p. 88 (1964), dissolved in an inert solvent such as, for example, chloroform, to produce 10,11-dibromo-10,11 - dihydro-5H-dibenzo[a,d]cycloheptene-5-carboxamide, which upon treatment with either boiling water or a boiling alkanol yields 11-bromo-10,5-(epoxymethano)-10,11-dihydro - 5H-dibenzo[a,d]cyclohepten-13-one. The latter compound is treated with either ammonium hydroxide solution or an aqueous solution or a suspension of an amine of formula H₂NR in which R is limited as defined above, in an autoclave at a temperature within the range of 100° C. to 150° C. to yield the 11-hydroxy-10,5-(iminomethano)-5H-dibenzo[a,d]cyclohepten-13-one of Formula I in which R is limited as defined above, R' represents the hydroxyl group, and R" represents hydrogen.

These last-named compounds in which R is limited to represent hydrogen, a lower alkyl group containing from 1–4 carbon atoms, or an aralkyl group containing from 7–10 carbon atoms, R' represents the hydroxyl group, and R" is hydrogen, are oxidized with chromic acid solution to yield the desired 10,5-(iminomethano)-10,11-dihydro-5H-dibenzo[a,d]cycloheptene-11,13-diones of Formula II, in which R represents hydrogen, a lower alkyl group containing from 1–4 carbon atoms, or an aralkyl group containing from 7–10 carbon atoms.

If it is desired to obtain the above 10,5-(iminomethano) - 10,11-dihydro-5H-dibenzo[a,d]cycloheptene 11, 13-diones of Formula II in which R represents the allyl group, a dialkylaminoalkyl group containing from 4–9 carbon atoms, or a heterocyclicalkyl group containing from 5–8 carbon atoms and from 1–2 hetero atoms, the compound of Formula II in which R represents hydrogen is treated with an allyl halide, or with the corresponding dialkylaminoalkyl halide or with the corresponding heterocyclicalkyl halide in the presence of an alkali metal hydride, preferably sodium hydride, to yield the 10,5-(iminomethano) - 10,11 - dihydro-5H-dibenzo[a,d]cycloheptene-11,13-diones of Formula II in which R represents the allyl group, a dialkylaminoalkyl group containing from 4–9 carbon atoms, or a heterocyclicalkyl group containing from 5–8 carbon atoms and from 1–2 hetero atoms. More specifically, the 11-hydroxylated compounds of Formula I in which R' represents the hydroxyl group, R is as defined above, and R" represents an organic group, as defined above, are prepared by the following process. Thus, a 10,5-(iminomethano)-10,11-dihydro-5H-dibenzo[a,d]cycloheptene-11,13-dione of Formula II wherein R is as defined in the first instance is dissolved in an inert solvent, preferably boiling tetrahydrofuran, and treated with a molar excess of a Grignard reagent of formula R"MgX wherein R" represents an organic group as defined above to yield, after decomposition of the Grignard complex with ammonium chloride solution, the corresponding 11 - substituted - 11-hydroxy-10,5-(iminomethano) - 10,11-dihydro-5H-dibenzo[a,d]cyclohepten-13-one of Formula I in which R is as defined above, R" is an organic group as defined above and R' represents the hydroxyl group.

The compounds of Formula I wherein R' represents hydrogen and R" and R are as defined above are prepared in the following manner. Thus, a compound of Formula I wherein R' represents the hydroxyl group and R and R" are as defined above is suspended in liquid ammonia and treated with a molar excess of sodium metal to yield, after treatment with ammonium chloride and evaporation of the solvent, the corresponding 10,5-(iminomethano) - 10,11 - dihydro-5H-dibenzo[a,d]cyclohepten-13-one of Formula I wherein R' represents hydrogen and R and R" are as defined above.

Alternatively the same compounds may be prepared by the following general method. Thus a 10,5-(iminomethano) - 10,11 - dihydro-5H-dibenzo[a,d]cyclohepten-13-one of Formula I wherein R represents hydrogen and R' and R" are as defined above is dissolved in an inert solvent, optionally dioxan, and treated with one molar equivalent of sodium hydride and then with one molar equivalent of an organic halide of the formula R—X, in which R is as defined above and X represents a halogen with an atomic weight greater than 19, at a temperature within the range of 50° C. to 100° C. for a period of time of up to two days, to yield, after evaporation of solvent and leaching with water, the corresponding 10,5-(iminomethano) - 10,11 - dihydro-5H-dibenzo[a,d]cyclohepten-13-one of Formula I wherein R' represents hydrogen or the hydroxyl group, R" is as defined above, and R is an organic group as defined above.

The compounds of Formula I, obtained as above, in which R' represents the hydroxyl group and R and R" are as defined above may, in turn, be subjected to hydrogenolysis, as described above, to yield the compounds of Formula I wherein R' represents hydrogen and R and R" are as defined above.

The following formulae and examples will illustrate this invention:

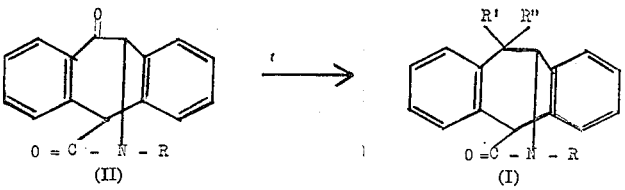

(II)     (I)

EXAMPLE 1

11-hydroxy-11-methyl-10,5-(iminomethano)-10,11-dihydro-5H-dibenzo[a,d]cyclohepten-13-one To a stirred solution of 10,5-(iminomethano)-10,11-dihydro-5H-dibenzo[a,d]cycloheptene-11,13-dione (9.98 g.) in dry tetrahydrofuran (100 ml.) is added an ethereal solution of methyl magnesium bromide (40 ml. of a 3 M solution) during 10 minutes. The mixture is stirred and refluxed for a further 3.5 hours, cooled, and diluted with ammonium chloride solution. The organic phase is collected, dried, and evaporated. The residue is crystallized from methanol to give the title product with M.P. 278–280° C.

In the same manner, but using ethyl, propyl, butyl, allyl, phenyl, benzyl, phenethyl, or trimethoxybenzyl, magnesium bromide or iodide as starting materials, and processing as above, the corresponding 11-ethyl-, 11-propyl-, 11-butyl-, 11-phenyl-, 11-allyl-, 11-benzyl-, 11-phenethyl-, or 11-trimethoxybenzyl 11-hydroxy-10,5-(iminomethano)-10,11-dihydro - 5H - dibenzo[a,d]cyclohepten-13-ones are obtained.

EXAMPLE 2

11 - hydroxy - 11 - dimethylaminopropyl - 10,5 - (iminomethano) - 10,11 - dihydro - 5H - dibenzo[a,d]cyclohepten-13-one Iodine activated magnesium turnings (4.97 g.) are covered with dry tetrahydrofuran (15 ml.) and to the stirred suspension is added methyl iodide (0.2 ml.). The mixture is gently warmed until a reaction commences and then dimethylaminopropyl chloride (23.93 g.) in dry tetrahydrofuran (30 ml.) is added at a rate sufficient to maintain the exothermic reaction. The mixture is allowed to cool and then 10,5-(iminomethano)-10,11-dihydro-5H-dibenzo[a,d]cycloheptene-11,13-dione (20.0 g.) dissolved in dry tetrahydrofuran (220 ml.) is added dropwise during 30 minutes whereupon an exothermic reaction occurs. This mixture is then refluxed for 6 hours. The cooled reaction mixture is treated with saturated ammonium chloride solution (100 ml.) and the mixture is vigorously stirred for 30 minutes. The organic phase is collected and the aqueous layer is extracted with tetrahydrofuran. The organic solutions are combined and then evaporated and the residue is dissolved in ethyl acetate and this solution is extracted thoroughly with 10% hydrochloric acid. The combined acid extracts are basified and extracted with ethyl acetate. The ethyl acetate extracts are combined, water-washed and then evaporated. The residue is crystallized from methanol to yield the title product with M.P. 192–195° C.

In the same manner, but using diethylaminopropyl or diisopropylaminopropyl chloride or bromide as starting materials, and processing as above, the corresponding 11-diethylaminopropyl- or 11-diisopropylaminopropyl-11-hydroxy-10,5-(iminomethano)-10,11-dihydro - 5H - dibenzo [a,d]cyclohepten-13-ones are obtained.

EXAMPLE 3

11-methyl-10,5-(iminomethano)-10,11-dihydro-5H-dibenzo[a,d]cyclohepten-13-one 11-hydroxy-11-methyl-10,5-(iminomethano)-10,11 - dihydro-5H-dibenzo[a,d]cyclohepten-13-one, prepared as described in Example 1 (4.0 g.) is suspended in freshly distilled liquid ammonia (50 ml.) and vigorously stirred while small pieces of sodium are added until a permanent blue colour is attained. The mixture is decolourized with solid ammonium chloride, the ammonia is allowed to evaporate, and the water insoluble portion of the residue is crystallized from methanol to yield the title product with M.P. 243–246° C.

In the same manner, but using 11-ethyl-, 11-propyl-, 11-butyl-, 11-allyl-, 11-benzyl-, 11-phenethyl-, 11-phenyl-, or 11-trimethoxybenzyl-, 11-hydroxy-10,5-(iminomethano) 10,11-dihydro-5H-dibenzo[a,d]cyclohepten - 13 - ones as starting materials, and processing as above, the corresponding 11-ethyl-, 11-propyl-, 11-butyl-, 11-allyl-, 11-benzyl-, 11-phenyl-, 11-phenethyl-, and 11-trimethoxybenzyl-10,5-(iminomethano)-10,11 - dihydro - 5H - dibenzo[a,d]cyclohepten-13-ones are obtained.

EXAMPLE 4

11-dimethylaminopropyl-10,5-(iminomethano)-10,11-dihydro-5H-dibenzo[a,d]cyclohepten-13-one To a stirred suspension of 11-dimethylaminopropyl-11-hydroxy - 10,5 - (iminomethano)-10,11-dihydro-5H-dibenzo[a,d]cyclohepten-13-one, prepared as described in Example 2 (5.0 g.) in freshly distilled liquid ammonia (100 ml.) is added sodium in small pieces until the mixture becomes permanently blue. The mixture is stirred for a further 8 minutes and then cautiously decolourized with solid ammonium chloride. The ammonia is allowed to evaporate and the water insoluble portion of the residue is dissolved in chloroform and filtered through an alumina column. The combined eluates are evaporated and the resildue is crystallized from benzenehexane to yield the title product with M.P. 197–200° C.

In the same manner, but using 11-diethylaminopropyl- or 11-diisopropylaminopropyl - 11 - hydroxy-10,5-(iminomethano)-10,11-dihydro - 5H - dibenzo[a,d]cyclohepten-13-ones as starting materials, the corresponding 11-diethylaminopropyl- and 11-diisopropylaminopropyl-10,5-(iminomethano) - 10,11 - dihydro-5H-dibenzo[a,d]cyclohepten-13-ones are obtained.

EXAMPLE 5

11-benzyl-11-hydroxy-10,5-(iminomethano)-10,11-dihydro-5H-dibenzo[a,d]cyclohepten-13-one In the same manner as described in Example 1, but using 10,5 - (iminomethano)-10,11-dihydro-5H-dibenzo [a,d]cyclohepten-13-one and benzyl magnesium bromide as starting materials, the above title compound is obtained. It is purified from isopropanol to M.P. 282–285° C.

EXAMPLE 6

11-benzyl-10,5-(iminomethano)-10,11-dihydro-5H-dibenzo[a,d]cyclohepten-13-one

In the same manner as described in Example 4, but using 11-benzyl-11-hydroxy-10,5-(iminomethano)-10,11-dihydro-5H-dibenzo[a,d]cyclohepten-13-one as starting material, the above title compound is obtained. It is crystallized from dioxan-water to M.P. 270–275° C.

EXAMPLE 7

11-hydroxy-11-phenyl-10,5-(iminomethano)-10,11-dihydro-5H-dibenzo[a,d]cyclohepten-13-one In the same manner as described in Example 1, but using 10,5-(iminomethano)-10,11-dihydro - 5H-dibenzo[a,d]cyclohepten - 11,13-dione and phenyl magnesium bromide as starting materials, the above title product is obtained. It is purified from isopropanol to M.P. 280–285° C.

EXAMPLE 8

11-hydroxy-11-phenyl-12-ethyl-10,5-(iminomethano)-10,11-dihydro-5H-dibenzo[a,d]cyclohepten-13-one In the same manner as described in Example 1, but using 12-ethyl-10,5-(iminomethano) - 10,11-dihydro-5H-dibenzo[a,d]cyclohepten - 11,13-dione and phenyl magnesium bromide as starting materials, the above title product is obtained. It is purified from ethanol to M.P. 237–240° C.

Alternatively, following the method described in Example 12 but using 11-hydroxy - 11-phenyl-10,5-(iminomethano) - 10,11-dihydro - 5H-dibenzo[a,d]cyclohepten-13-one and ethyl bromide as starting materials, the title compound described above is obtained.

EXAMPLE 9

12-ethyl-11-phenyl-10,5-(iminomethano)-10,11-dihydro-5H-dibenzo[a,d]cyclohepten-13-one Small pieces of metallic sodium are added to a stirred suspension of 11-hydroxy - 11-phenyl - 12-ethyl - 10,5-(iminomethano) - 10,11-dihydro - 5H-dibenzo[a,d]cyclohepten - 13-one (500 mg.), prepared as described in Example 8, in liquid ammonia until the mixture becomes permanently blue. The mixture is stirred for 30 minutes and then decolourized with ammonium chloride. The solvent is allowed to evaporate and the residue is leached with water. The insoluble residue is crystallized from dioxan-water to give the above title product with M.P. greater than 270° C.

EXAMPLE 10

11-hydroxy-11-phenyl-12-propyl-10,5-(iminomethano)-10,11-dihydro-5H-dibenzo[a,d]cyclohepten-13-one In the same manner as described in Example 1, but using 12-propyl - 10,5-(iminomethano) - 10,11-dihydro-5H - dibenzo[a,d]cyclohepten - 11,13-dione and phenyl magnesium bromide as starting materials, the above title product is obtained. It is purified from ethanol to M.P. 198–201° C.

Alternatively, following the method described in Example 12 but using 11-hydroxy - 11-phenyl - 10,5-(iminomethano) - 10,11-dihydro - 5H-dibenzo[a,d]cyclohepten-13-one and propyl bromide as starting materials, the above title compound is obtained.

EXAMPLE 11

11,12-dimethyl-11-hydroxy-10,5-(iminomethano)-10,11-dihydro-5H-dibenzo[a,d]cyclohepten-13-one In the same manner as described in Example 1, but using 12-methyl - 10,5-(iminomethano) - 10,11-dihydro-5H-dibenzo[a,d]cyclohepten - 11,13-dione and methyl magnesium bromide as starting materials, the above title product is obtained. It is purified from methanol to M.P. 224–227° C.

Alternatively, following the method described in Example 12 but using 11-methyl - 11-hydroxy - 10,5-(iminomethano) - 10,11-dihydro - 5H-dibenzo[a,d]cyclohepten-13-one, prepared as described in Example 1, and methyl iodide as starting materials the title compound described above is obtained.

EXAMPLE 12

12-dimethylaminopropyl-10,5-(iminomethano)-10,11-dihydro-5H-dibenzo[a,d]cyclohepten-11,13-dione Dimethylaminopropyl chloride (1.5 g.) is added dropwise to a mixture of 10,5-(iminomethano)-10,11-dihydro-5H-dibenzo[a,d]cyclohepten - 11,13-dione (2.49 g.) and sodium hydride (450 mg.). The mixture is stirred and refluxed for 6 hours, evaporated to dryness and diluted with water. The mixture is then extracted with ether and the washed and dried extracts are evaporated to dryness to leave the title product as an oil characterized by its infrared spectrum with maximum at 2950, 2825, 2775, 1675 and 1600 cm.$^{-1}$.

In the same manner but using allyl, dimethylaminoethyl, diisopropylaminopropyl, pyrrolidinoethyl, piperidinoethyl, N'-(methylpiperazino)propyl or morpholinoethyl chloride or bromide instead of dimethylaminopropyl chloride the 12-allyl-, 12-dimethylaminoethyl-, 12-diisopropylaminopropyl-, 12-pyrrolidinoethyl-, 12-piperidinoethyl-, 12-(N'-methylpiperazino)propyl or 12-morpholinoethyl - 10,5-(iminomethano)-10,11-dihydro - 5H-dibenzo[a,d]-cyclohepten-11,13-diones are also obtained.

EXAMPLE 13

In the same manner as described in Examples 1, 2, 5, 7, 8, 10, or 11, but using as starting materials the 12-methyl-, 12-ethyl-, 12-propyl-, 12-butyl-, 12-allyl-, 12-benzyl-, 12-phenethyl-, 12-trimethoxybenzyl-, 12-dimethylaminoethyl-, 12-dimethylaminopropyl-, 12-diisopropylaminopropyl-, 12-pyrrolidinoethyl-, 12-piperidinoethyl-, 12 - (N'-methylpiperazino)-propyl-, or 12 - morpholinoethyl - 10,5-(iminomethano) - 10,11-dihydro - 5H-dibenzo[a,d]cycloheptene - 11,13-diones and the Grignard reagents prepared from methyl, ethyl, propyl, butyl, allyl, phenyl, benzyl, phenethyl, trimethoxybenzyl, dimethylaminopropyl, diethylaminopropyl, or diisopropylaminopropyl halides, the 12-methyl, 12-ethyl, 12-propyl, 12-butyl, 12-allyl, 12-benzyl, 12-phenethyl, 12-trimethoxybenzyl, 12-dimethylaminoethyl, 12-dimethylaminopropyl, 12-diisopropylaminopropyl, 12-pyrrolidinoethyl, 12-piperindinoethyl, 12-(N'-methylpiperazino)propyl, or 12-morpholinoethyl-, derivatives of 11-methyl-, 11-ethyl-, 11-propyl-, 11-butyl-, 11-allyl-, 11-phenyl-, 11-benzyl-, 11-phenethyl-, 11-trimethoxybenzyl-, -dimethylaminopropyl, 11-diethylaminopropyl-, and 11-diisopropylaminopropyl-11-hydroxy - 10,5-(iminomethano)-10,11-dihydro - 5H-dibenzo[a,d]cycloheptene - 13-ones are also obtained.

EXAMPLE 14

In the same manner as obtained in Examples 3, 4, 6, or 9 but using as starting materials the 12-methyl, 12-ethyl, 12-propyl, 12-butyl, 12-allyl, 12-benzyl, 12-phenethyl, 12-trimethoxybenzyl, 12-dimethylaminoethyl, 12-dimethylaminopropyl, 12 - diisopropylaminopropyl, 12-pyrrolidinoethyl, 12-piperidinoethyl, 12-(N'-methylpiperazino)propyl, or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, and 11 - diisopropylaminopropyl - 11 - hydroxy - 10,5 - (iminomethano) - 10,11 - dihydro - 5H - dibenzo[a,d]cycloheptene-13-ones, the corresponding 12-methyl, 12-ethyl, 12-propyl, 12-butyl, 12-allyl, 12-benzyl, 12-phenethyl, 12-trimethoxybenzyl, 12-dimethylaminoethyl, 12-dimethylaminopropyl, 12-diisopropylaminopropyl, 12-pyrrolidinoethyl, 12-piperidinoethyl, 12-(N'-methylpiperazino)propyl or 12-morpholinoethyl derivatives of 11-methyl-, 11-ethyl-, 11-propyl-, 11-butyl-, 11-allyl-, 11-phenyl-, 11-benzyl-, 11-phenethyl-, 11-trimethoxybenzyl-, 11-dimethylaminopropyl-, 11-diethylaminopropyl-, and 11-diisopropylaminopropyl - 10,5-(iminomethano)-10,11-dihydro-5H-dibenzo[a,d]cyclohepten-13-ones are also obtained.

We claim:

1. A compound of the formula

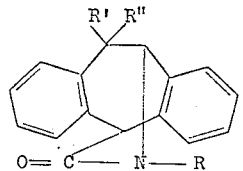

wherein R is selected from the group consisting of hydrogen, lower alkyl containing from 1 to 4 carbon atoms, allyl, benzyl, phenethyl, trimethoxybenzyl, dialkylaminoalkyl containing from 4 to 9 carbon atoms, and a heterocyclicalkyl group selected from the group consisting of pyrrolidinoethyl, piperidinoethyl, (N'-methylpiperazino)propyl and morpholinoethyl groups; R' is hydrogen; and R" is selected from the group consisting of lower alkyl containing from 1 to 4 carbon atoms, allyl, phenyl, benzyl, phenethyl, trimethoxybenzyl, and dialkylaminoalkyl containing from 5 to 9 carbon atoms.

2. 11 - methyl - 10,5 - (iminomethano) - 10,11 - dihydro-5H-dibenzo[a,c]cyclohepten-13-one.

3. 11 - dimethylaminopropyl - 10,5 - (iminomethano)-10,11-dihydro-5H-dibenzo[a,d]cyclohepten-13-one.

4. 11 - benzyl - 10,5 - (iminomethano) - 10,11 - dihydro-5H-dibenzo[a,d]cyclohepten-13-one.

5. 12 - ethyl - 11 phenyl - 10,5 - (iminomethano) - 10,11-dihydro-5H-dibenzo[a,d]cyclohepten-13-one.

6. 11,12 - dimethyl - 11 - hydroxy - 10,5 - (iminomethano) - 10,11 - dihydro - 5H - dibenzo[a,d]cyclohepten-13-one.

7. 12 - dimethylaminopropyl - 10,5 - (iminomethano)-10,11-dihydro-5H-dibenzo[a,d]cyclohepten-11,13-dione.

8. The process of preparing a compound of the formula

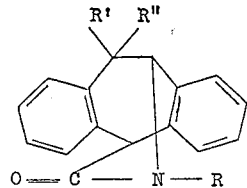

wherein R is selected from the group which consists of hydrogen, lower alkyl of from 1 to 4 carbon atoms, allyl, benzyl, phenethyl, trimethoxybenzyl, dialkylaminoalkyl containing from 4 to 9 carbon atoms and a heterocyclicalkyl group selected from the group consisting of pyrrolidinoethyl, piperidinoethyl, (N' - methylpiperazino) propyl and morpholinoethyl groups; R' is hydrogen; and R" is selected from the group which consists of lower alkyl containing from 1 to 4 carbon atoms, allyl, phenyl, benzyl, phenethyl, trimethoxybenzyl, and dialkylaminoalkyl containing from 5 to 9 carbon atoms which comprises reacting the corresponding 11,13-dione of formula

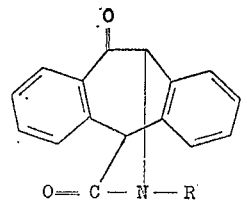

with a Grignard reagent of the formula R″MgX wherein X is halogen and R″ is as above defined; and subjecting the intermediate 11-hydroxy compound first formed to hydrogenolysis.

References Cited

Fieser and Fieser "Organic Chemistry," 3rd ed., pp. 117–120 (1956), (Reinhold).

HENRY R. JILES, Primary Examiner

R. T. BOND, Assistant Examiner

U.S. Cl. X.R.

424—244, 248, 250, 267